US012747552B2

(12) United States Patent
Ingraffia

(10) Patent No.: US 12,747,552 B2
(45) Date of Patent: Sep. 29, 2026

(54) TIRE SPIKER WITH EXTENDABLE HANDLE

(71) Applicant: Chris Ingraffia, Chicago, IL (US)

(72) Inventor: Chris Ingraffia, Chicago, IL (US)

(73) Assignee: Chris Ingraffia, Chicago, IL (US)

( * ) Notice: Subject to any disclaimer, the term of this patent is extended or adjusted under 35 U.S.C. 154(b) by 732 days.

(21) Appl. No.: 18/102,234

(22) Filed: Jan. 27, 2023

(65) Prior Publication Data

US 2023/0167616 A1 Jun. 1, 2023

Related U.S. Application Data

(63) Continuation-in-part of application No. 17/482,711, filed on Sep. 23, 2021, now Pat. No. 12,276,072.

(51) Int. Cl.
*E01F 13/12* (2006.01)
*E05D 7/10* (2006.01)

(52) U.S. Cl.
CPC .......... *E01F 13/123* (2013.01); *E05D 7/1011* (2013.01)

(58) Field of Classification Search
CPC ................................ E01F 13/123; E01F 13/12
See application file for complete search history.

(56) References Cited

U.S. PATENT DOCUMENTS

| | | | | |
|---|---|---|---|---|
| 5,322,385 A * | 6/1994 | Reisman | E01F 9/70 | 404/6 |
| 5,775,832 A * | 7/1998 | Kilgrow | E01F 13/12 | 404/6 |
| 6,994,488 B2 * | 2/2006 | Crowley, Sr. | E01F 13/12 | 404/6 |
| 7,186,052 B2 * | 3/2007 | Rom | B60R 25/09 | 404/6 |
| 2004/0101361 A1 * | 5/2004 | Eichenberg | E01F 13/12 | 404/6 |
| 2011/0135385 A1 * | 6/2011 | Washington | E01F 13/12 | 404/6 |

* cited by examiner

*Primary Examiner* — Abigail A Risic
(74) *Attorney, Agent, or Firm* — James D Palmatier; Applied Patent Services

(57) ABSTRACT

The tire spiker with an extendable handle may comprise a pair of spike portions pivotally connected by a spring loaded hinge adapted to hold the spike portions in a deployed U-Shaped configuration to be deployed in front of and behind a tire in a traffic stop. An extendable handle on the frame may have a release button adapted to release a latch holding the spike portions together in a carry configuration. The spring loaded hinge urges the spike portions in a spaced, parallel orientation for surrounding a tire in a deployed configuration. The tire spiker with extendable handle is moved to a position whereby the two spike portions are in front of and behind a tire. The spike portions have upward oriented spikes adapted to puncture the tire if the tire rolls forward or backwards.

14 Claims, 6 Drawing Sheets

FIG. 1
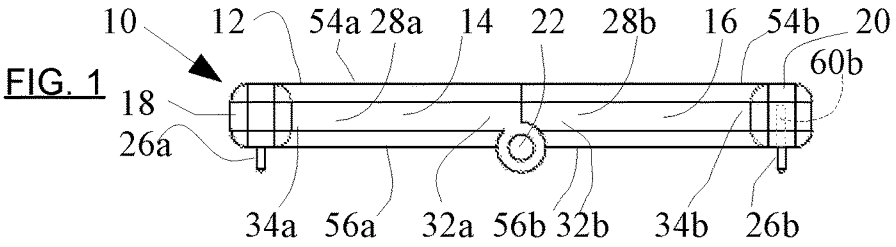
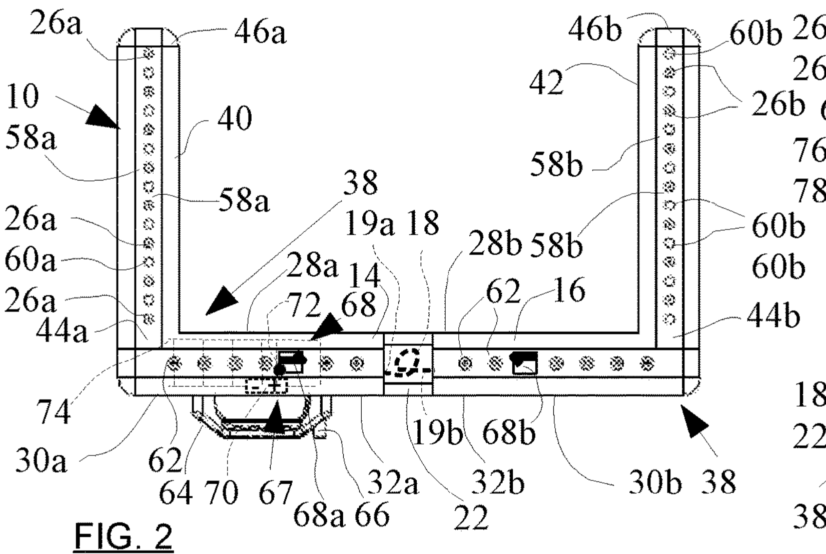
FIG. 2
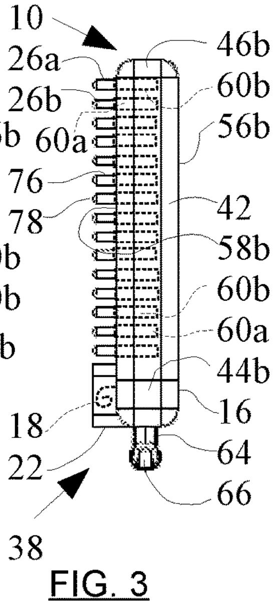
FIG. 3
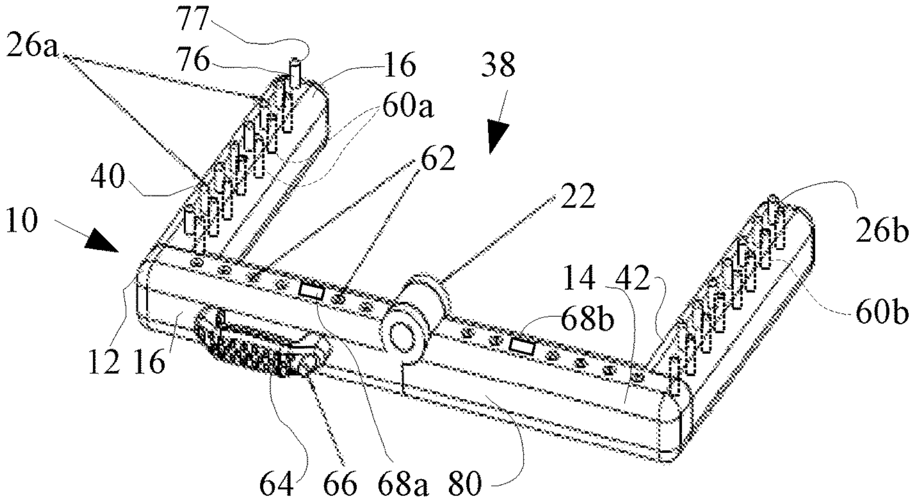
FIG. 4

TIRE SPIKER WITH EXTENDABLE HANDLE

FIELD OF THE INVENTION

The present invention relates generally to a device for disabling a tire on a stopped vehicle for use by law enforcement to prevent a high speed chase during a traffic stop or the like.

DESCRIPTION OF RELATED ART

Law enforcement officers stop cars for various reasons relating to safety and bad behavior. Accordingly, protocols dictate that the law enforcement officer approaches the driver of the stopped vehicle to confront the driver and the other car occupants to get more information. Statistics show that this is one of the most dangerous situations for a law enforcement officer to be in. The driver of the vehicle may be stressed for a number of reasons. Regardless of the reason, a significant percentage of drivers that have been pulled over attempt to flee. A high speed chase may result from the car driver wishing to avoid contact with the officer and fleeing the scene of the traffic stop. These attempts to flee often occur when the law enforcement officer is out of his/her vehicle and is standing next to the stopped vehicle. The result is that a law enforcement officer or others may be injured or killed by the fleeing vehicle.

There exists a long felt need for a system that can enable a law enforcement officer to attempt to disable a vehicle to prevent a high speed chase during a traffic stop. It is known to use a device such as a boot to immobilize a car wheel or tire puncture strips in front of and behind a wheel on the vehicle to puncture tires of a moving vehicle. Both of these methods require action on the part of the officer that may place the officer in danger. The boot requires the officer to get under the car. The tire puncture strips require the officer to get in front of the vehicle usually after the chase has begun. Both scenarios put the officer in harm's way if the driver tries to flee. Alternative tire spiking systems such as U.S. Pat. No. 7,186,052 B2 for Vehicle Tire Deflating apparatus to Rom are bulky and fail to provide protection to the officer during transport and deployment. Accordingly, the use of prior art wheel locks and tire puncturing apparatus actually increases the danger to an officer during a traffic stop.

There is a need for a device to prevent a driver from fleeing the scene of a traffic stop in a high speed chase. The device should be small, light, deployable with one hand and easily retrieved and stored. Therefore, it is desirable to provide a tire spiker in a small easy to use package that will damage a vehicle tire in the event a driver flees a scene of a traffic stop. The tire spiker may comprise an extendable handle to help deploy without bending over or diverting attention from the driver.

BRIEF DESCRIPTION OF THE PRESENT INVENTION

The present invention is a tire spiker comprising a U-shaped frame hinged to close to an L-shaped carry configuration wherein the tire spikes are encased and not exposed in the carry configuration. The U-shaped frame may comprise two L-shaped arms. Each of the two L-shaped arms may comprise a spacer portion and a spike portion. The spacer portion may have two ends comprising a hinge end and a spike end. The hinge end may be attached to a spring loaded hinge. The spike portion attached to the spike end in a generally perpendicular orientation. When folded together around the hinge the tire spiker forms an L-shape having the tire piercing spikes encased in individual spike chambers. When deployed, the two L-Shaped arms form a U-Shape for arrangement around a tire of a stopped vehicle having the spike portions disposed adjacent to the tread portion of a tire with one in front of the tire and one behind to discourage moving the vehicle by rolling the tire forward or backward. The spike portion may comprise a spacer end and a distal end. The spike portion may be disposed generally perpendicular to the spacer portion. The spike portion further comprises a road side and a spike side. A plurality of spikes are disposed in the spike side having tips spaced from the spike portion. A plurality of spike chambers are formed in the tier engagement portion extending from an opening on the spike side and extending into the spike portion toward the road side. Each one of the plurality of spike chambers adapted to receive one of the plurality of spikes on the other of the two L-shaped arms.

The two L-shaped arms are pivotally joined together at the hinge on each hinge end whereby the two L-shaped arms are movable from a carry configuration to a deployed configuration by pivoting about the hinged connection. In the carry configuration, the tire spiker is disposed in an L-shaped configuration having each one of the plurality of tire spikes disposed in one of the plurality of spike chambers in the other of the two L-shaped arms. In the deployed configuration, the tire spiker is urged by the spring loaded hinge to a generally U-shaped configuration having the spike portions spaced from each other and generally parallel. The plurality of spikes are exposed and disposed in a generally vertical orientation extending from the spike side. The tire spiker is placed in a surrounding position to the tire with the first spike portion in front of the vehicle tire and the second spike portion behind the vehicle tire and the spacer portion adjacent to the tire sidewall.

A handle may be disposed on the frame preferably in spaced relation to the tire. One of the spacer portions may be between the handle and the tire in the deployed configuration.

The spring loaded hinge may be used for quick deployment. The spring loaded hinge may be adapted to urge the two L-shaped arms into the deployed configuration. A latch on the tire spiker may be adapted to retain the two L-shaped arms in the carry configuration until the latch is released whereby the two L-shaped arms may be urged apart by the spring loaded hinge to the deployed configuration having the spike portions spaced from each other and generally parallel to each other.

The tire spiker may comprise a handle on the frame. The handle may be extendable to allow compact carry. The deployment control may be in the handle to allow deployment while maintaining eye contact with the car driver.

The above description sets forth, rather broadly, the more important features of the present invention so that the detailed description of the preferred embodiment that follows may be better understood and contributions of the present invention to the art may be better appreciated. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 1 is a back elevation view of a tire spiker in accordance with the present invention;

FIG. 2 is a top plan view thereof;

FIG. 3 is a side view thereof;

FIG. 4 is a top perspective thereof;

DETAILED DESCRIPTION OF THE PREFERRED EMBODIMENT

Figure 5:
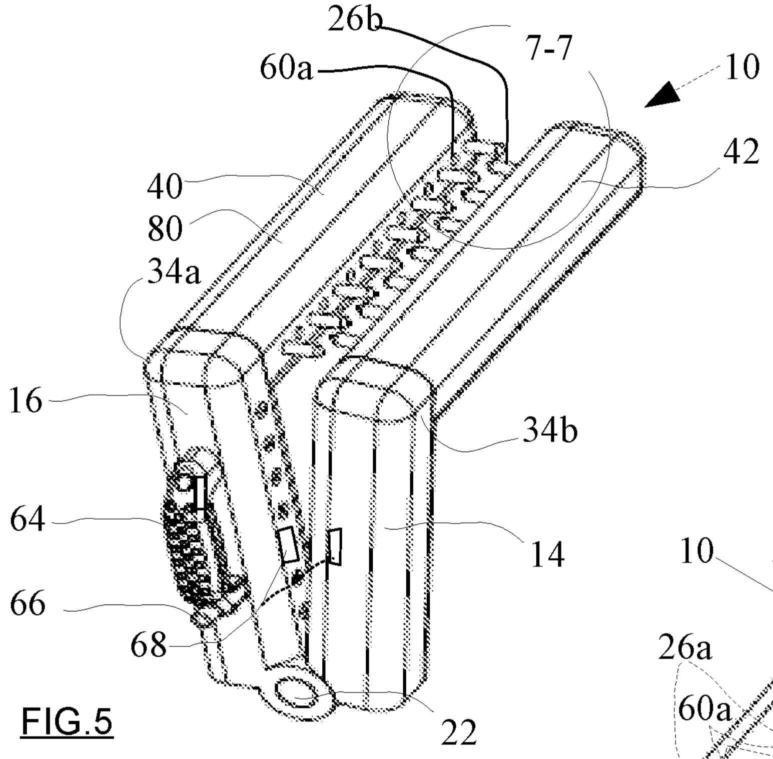
FIG. 5 is a top perspective view thereof in a partially deployed configuration.

Referring now to the drawings, FIG. 1 is a tire spiker 10 comprising a hinged frame 12 having a first and second spacer portion 14, 16. Each of the first and second spacer portions 14, 16 comprising a tire side 28*a*, 28*b*, a hinge end 32*a*, 32*b* and a spike end 34*a*, 34*b*. A spring loaded hinge 22 may be disposed on the first hinge end 32*a* and the second hinge end 32*b* whereby spring loaded hinge 22 may be adapted to pivotally attach the first hinge end 32*a* to the second hinge end 32*b*. The spring loaded hinge 22 may comprise spring 18 having a first end 19*a* on the first hinge end 32*a* and a second end 19*b* on the second hinge end 32*b*. The spring 18 adapted to urge the first and second spacer portions 14, 16 to move from a carry configuration 36 (FIG. 6) having the first spike end 34*a* adjacent to the second spike end 34*b* and the first spacer portion adjacent to and generally parallel to the second spacer portion to a deployed configuration 38 having the first spike end 34*a* in spaced relation to the second spike end 34*b*. Each of the spacer portions 14, 16 in an end to end configurations with the spike ends 34*a*, 34*b* spaced from each other. The spacer portions 14, 16 may further comprise a spacer road side 54*a*, 54*b* and a spacer top side 56*a*, 56*b*.

Referring to FIG. 2, the tire spiker 10 in the deployed configuration 38, may further comprise a first and second spike portion 40, 42. Each of the first and second spike portions 40, 42 may comprise a spike side 58*a*, 58*b*, a spacer end 44*a*, 44*b* and a distal end 46*a*, 46*b*. Each of the first and second spike sides 58*a*, 58*b* may further comprise a plurality of spikes 26*a*, 26*b* embedded therein and extending from the respective spike side 58*a*, 58*b* in a generally perpendicular orientation to the spike side 58*a*, 58*b*. The spikes 26*a*, 26*b* may extend 1-3 inches from the spike side 58*a*, 58*b*. The first spike portion 40 may be disposed in spaced relation and generally parallel to the second spike portion 42 in the deployed configuration.

Continuing to refer to FIG. 2, a plurality of spike chambers 60*a*, 60*b* may be formed on spike portions 40, 42. In the preferred embodiment, the spike chambers 60*a*, 60*b* and spikes 26*a*, 26*b* alternate having a spike chamber 60*a*, 60*b* between each pair of adjacent spikes 26*a*, 26*b*. The spike chambers 60*a*, 60*b* open on the spike side 58*a*, 58*b*. A first spike chamber 60*a* may be disposed between each adjacent pair of the plurality of first spikes 26*a*. Likewise, a second spike chamber 60*b* may be disposed between each adjacent pair of the plurality of second spikes 26*b*. In the embodiment on FIG. 2, first spike portion 40 may have a spike 26*a* disposed at the spacer end 44*a* and at the distal end 46*a* and second spike portion 42 may likewise have a spike chamber 60*b* at each of the spacer end 44*b* and distal end 60*b* thereby to align a spike chamber 60*a*, 60*b* with a respective spike 26*a*, 26*b* in the opposing spike portion 40. 42.

Continuing to refer to FIG. 2, the frame 12 may further comprise a handle 64 having a release button 66 and an alarm 67. The release button 66 may comprise a lock 68. The lock 68 may comprise a retainer 68*a* and a receiver 68*b*. In the preferred embodiment a remote release lock 68 may comprise a electromagnet, solenoid or motor driven switch. The alarm 67 may comprise a switch 72, a battery 70 and an alarm indicator 62. The switch 72 may be adapted to electrically connect the battery 70 to the alarm indicator 62 when the tire spiker 10 is not in the carry configuration 36. The alarm indicator 62 may comprise LEDs 62, a buzzer or other device to alert the officer and the driver that the tire spiker 10 is in the deployed configuration 38. The alarm indicator 62 may be electrically connected to a battery 70 by a switch 72 connected to electrical circuit 74 whereby the switch may energize the alarm indicator 62 preferably when the tire spiker 10 is in the deployed configuration 38. The lock 68 may be adapted to hold the retainer 68*a* attached to the receiver 68*b* until actuated by the release button 66 whereby the receiver 68*b* releases the retainer 68*a* allowing the first spacer portion 14 to pivot about the hinge 22 to a deployed configuration 38. The lock 68 may comprise a latch and pawl, magnet or hook type connector as is known in the art. The frame 12 is urged to the deployed configuration 38 by the spring loaded hinge 22.

Referring to FIGS. 3 and 4, each of the plurality of spikes 26*a*, 26*b* may comprise a puncture portion 76 having a tip 78 spaced from the spike side 58*a*, 58*b* on the respective one of the spike portions 40, 42. The puncture portion 76 maybe hollow 77 such as a metal tube or conduit to help air release from a punctured tire. The spacer portions 14, 16 may have a kick plate 80 on the outside. Kick plate 80 may be adapted to bear against a shoe or other push device to move the tire spiker 10 into place. A first one of the plurality of spikes 26*a* adjacent the first distal end 46*a* may be aligned with a first one of the plurality of spike chambers 60*b* adjacent the second distal end 46*b*. Each one of the plurality of spikes 26*a*, 26*b* may have a corresponding spike chamber 60*a*, 60*b* in the opposing spike portion 40, 42. The corresponding spike chambers 60*a*, 60*b* may be adapted to receive one of the one of the plurality of spikes 26*a*, 26*b* in the opposing spike portion 40, 42. That is, each one of the plurality of spikes 26*a* may be disposed in a corresponding one of the plurality of spike chambers 60*b* in the second spike portion 42. Likewise, each one of the plurality of spikes 26*b* in the second spike portion 42 is adapted to extend into a corresponding one of the plurality of spike chambers 60*a* in the first spike portion 40.

Figure 6:
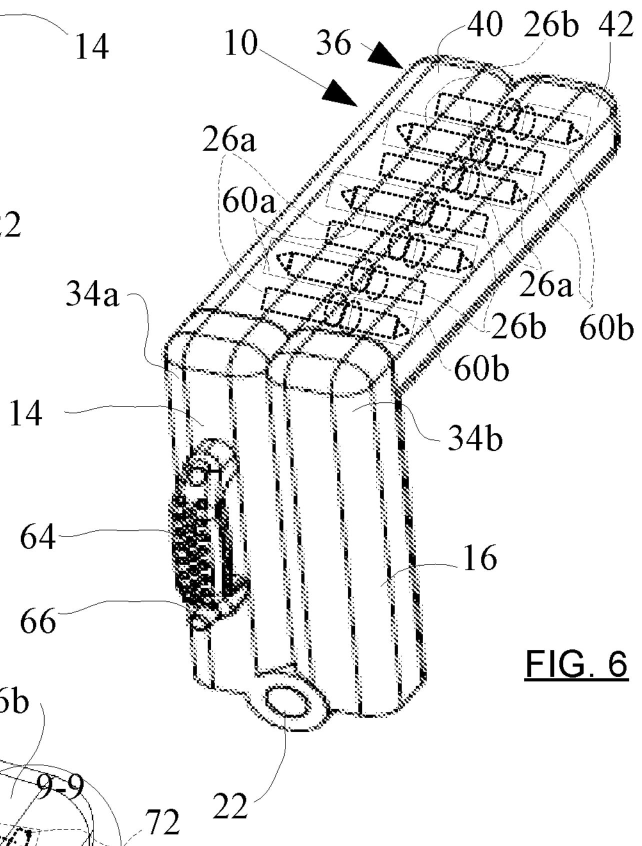
FIG. 6 is a top perspective view thereof in a carry configuration.
Figure 7:
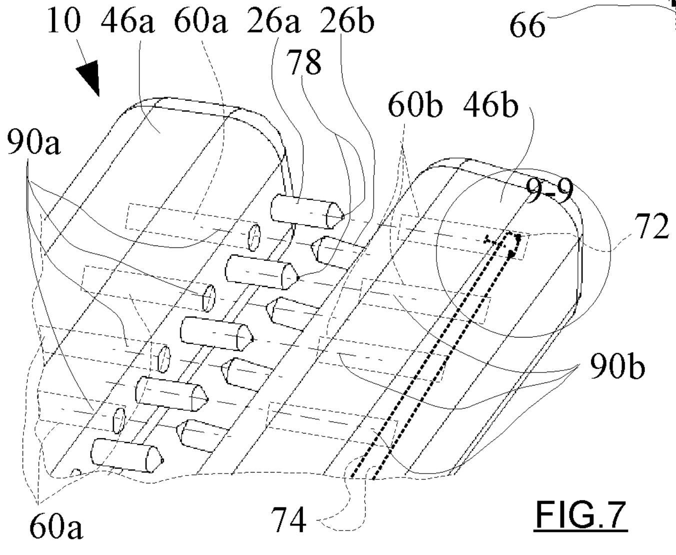
FIG. 7 is a section view taken at approximately 7-7 of FIG. 5.

Referring to FIGS. 5-7, the tire spiker 10 is illustrated between the deployed configuration 38 (FIGS. 1-4) and the carry configuration 36 in order to illustrate the alignment between each one of the plurality of spikes 26*a*, 26*b* and each one of the spike chambers 60*a*, 60*b*. In the L-shaped carry configuration 36 (FIG. 6) the first spike end 34*a* is adjacent to or on the second spike end 34*b* and each of the plurality of spikes 26*a*, 26*b* is disposed in a respective spike chamber 60*b*, 60*a* in the opposing spike portion 40, 42. Each of the plurality of spike chambers 60*a* in the first spike portion 40 may be adapted to receive a respective one of the plurality of spikes 26*b* in the second spike portion 42 in the carry configuration 36. Likewise, each of the plurality of spike chambers 60*b* in the second spike portion 42 may be adapted to receive one of the plurality of spikes 26*a* in the first spike portion 40 in the carry configuration 36. Each of the spike chambers 60*a*, 60*b* is disposed on the respective spike portion 40, 42 in alignment with one of the plurality of spikes 26*a*, 26*b* in the carry configuration 36.

Continuing to refer to FIG. 7, each one of the plurality of spike chambers 60*a*, 60*b* may comprise an axis 90*a*, 90*b* respectively. Each of the plurality of spikes 26*a*, 26*b* may be aligned with the respective axis 90*a*, 90*b* of the corresponding spike chamber 60*b*, 60*a* in the opposing spike portion 26*a*, 26*b* respectively in the carry configuration 36. In the carry configuration 36 each one of the spike tips 78 is disposed in alignment with the respective one spike chamber axis 90*a*, 90*b* in the opposing spike portion 40, 42. Each of the first spikes 26*a* in the first spike portion 40 may have a corresponding second spike chamber 60*b* in the second spike portion 42. Each of the second spikes 26*b* in the second spike portion 42 may have a corresponding first spike chamber 60*a* in the first spike portion 40 whereby each one of the plurality of first or second spikes may be disposed in a corresponding one of the plurality of first or second spike chambers 60*a*, 60*b* in the other of the first and second spike portions 40, 42 when the tire spiker 10 is configured in the carry configuration 36. Switch 72 may be disposed in a spike chamber 60*b* of second spike portion 42. Switch 72 may be adapted to engage tip 78 of corresponding one of the plurality of first spikes 26*a* in first spike portion 40.

Figure 8:
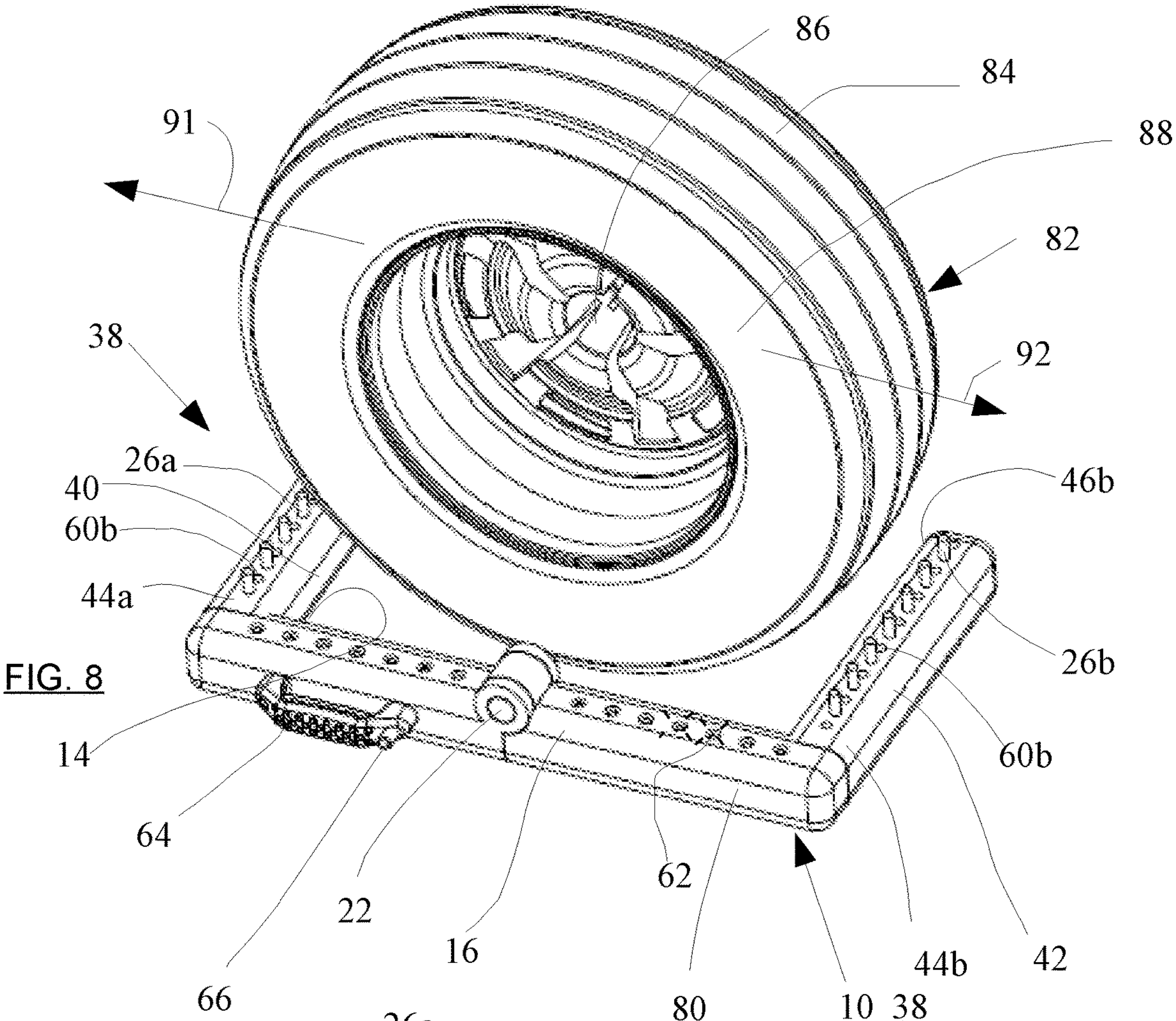
FIG. 8 is a top perspective view thereof in a partially deployed configuration.

Referring to FIG. 8, the tire spiker 10 may be disposed in the deployed configuration 38 surrounding a tire 82 having a rubber tread 84 and a hub 86. The tire spiker 10 may be pushed at the kick plate 80 to urge the spacer portions 14, 16 adjacent to or bearing on the tire 82 at the sidewall 88. The tire spiker 10 may have the first spike portion 40 disposed along a first travel path 91 for the tire 82 and the second spike portion 42 disposed along a second travel path 92 for the tire 82. The spikes 26*a*, 26*b* are held in a generally vertical orientation for penetration into the tread 84 if the tire 84 moves along the first or second travel path 91, 92. In the deployed configuration 38, the indicator 62 is energized by spike 26*a* moving away from plunger 95 allowing spanner 94 to close the circuit 74 energizing alarm indicator 62 to alert the driver and the officer that the tire spiker is deployed and movement of the vehicle will cause the tire 82 to be punctured by spikes 26*a*, 26*b*.

Figure 9A:
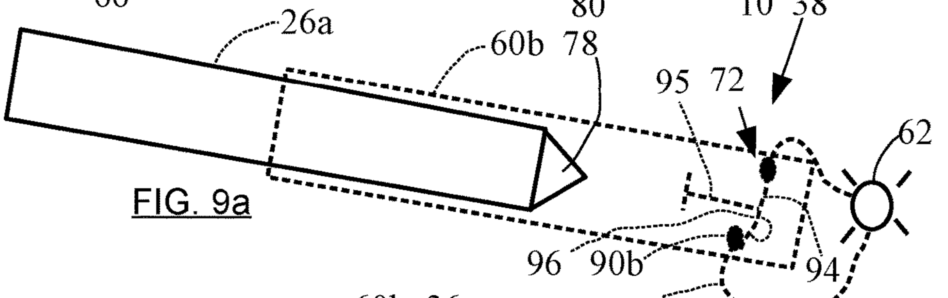
FIG. 9*a* is a section view taken at approximately 9-9 of FIG. 7 of the invention in a deployed configuration.
Figure 9B:
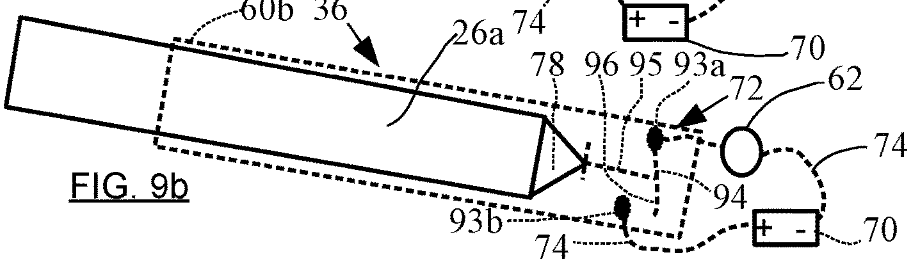
FIG. 9*b* is a section view taken at approximately 9-9 of FIG. 7 of the invention in a carry configuration.

Referring to FIGS. 9*a*, 9*b* switch 72 is electrically connected to alarm indicator 62 and to battery 70 by indicator circuit 74. Switch 72 may comprise terminals 93*a*, 93*b*, spanner 94 and plunger 95. Spanner 94 is attached to terminal 93*a*. Spanner 94 may further comprise movable end 96 bearing against terminal 93*b* until moved by plunger 95 pushed by spike 26*a*. Battery 70 may be connected to terminal 93*b*. Movable end 96 may be movable from a biased contact position (FIG. 9*a*) whereby terminal 93*a* may be connected to terminal 93*b* to a spaced position (FIG. 9*b*) from terminal 93*b* whereby terminal 93*a* is not connected to terminal 93*b*. In the deployed configuration 38 (FIG. 9*a*) circuit 74 is closed by biased spanner 94 bearing against terminal 93*b* thereby connecting alarm indicator 62 to battery 70. In the carry configuration 36 Spanner 94 may further comprise movable end 96. by first spike 26*a* not disposed in spike chamber 60*b* allowing spanner 94 to return to a biased closed position. FIG. 9A illustrates spike 26*a* spaced from switch 72 wherein spanner 94 is urged to bear against terminal 93*b* thus connecting terminal 93*a* to terminal 93*b* thereby connecting indicator 62 to battery 70 energizing indicator 62. FIG. 9B illustrates spike 26*a* disposed in spike chamber 60*b*. Spike tip 78 bears against plunger 95 to move movable end 96 into spaced relation to terminal 93*b* opening circuit 74 thereby disconnecting alarm indicator 62 from battery 70.

Referring to FIGS. 1-8, in use the tire spiker 10 is transported in the carry configuration 36 to a location adjacent tire 82. Release button 66 is pressed releasing lock 68 holding first and second spacer portions 14, 16. Spring loaded hinge 22 is adapted to urge tire spiker 10 in the deployed configuration 38 having the first and second spacer portions 14, 16 generally aligned having hinge 22 attached between them. Tire spiker 10 is disposed on the ground adjacent to the tire 82 having the road side 54*a*, 54*b* on the road and the spikes 26*a*, 26*b* extending from the top side 56*a*, 56*b* in a generally vertical orientation. The kick plate 80 may be used to kick the tire spiker 10 into position having the tire spiker 10 surrounding the tire 82 on three sides with the tire tread 84 disposed between the first spike portion 40 and the second spike portion 42. The indicator 62 is energized by switch 72 closing circuit 74 between battery 70 and indicator 62. When the tire spiker 10 is to be removed, handle 64 is used to lift tire spiker 10 away from tire 82. The first spacer portion 14 may be rotated about hinge 22 in a clam-shell motion to the carry configuration 36 having each one of the first spikes 26*a* disposed in a respective second spike chamber 60*b* and each one of second spikes 26*b* disposed in a respective first spike chamber 60. Spike 26*a* may engage switch 72 to open the circuit and disconnect the alarm indicator 62. Lock 68 engages to hold the tire spiker 10 in the carry configuration 36.

Figure 10:
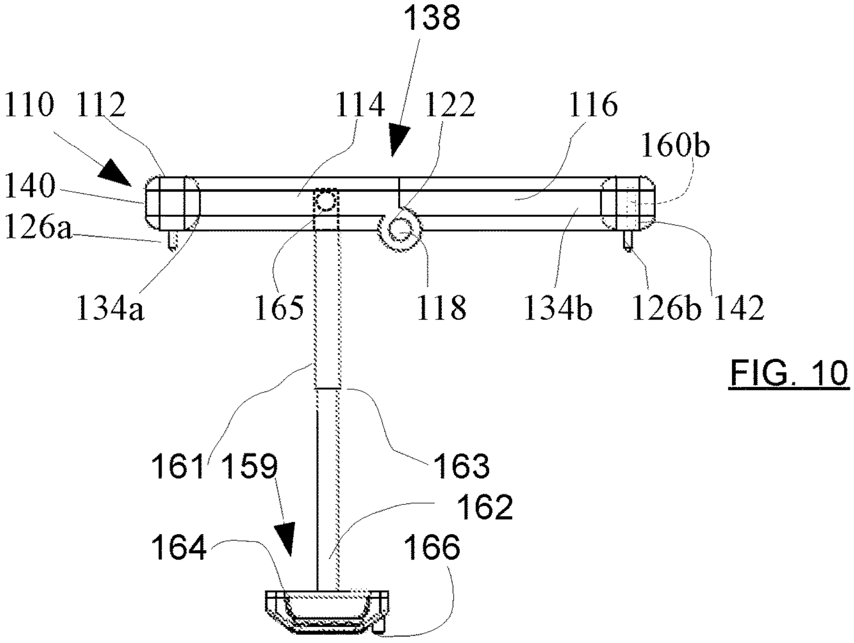
FIG. 10 is a is a back elevation view of an alternate embodiment of the tire spiker with the handle extended.

Referring to FIG. 10, a first alternative embodiment tire spiker 110 may further comprise an extendable handle 159. The extendable handle 159 may comprise a first section 161 attached to the frame 112 and a second section 162 attached to the grip 164. The first section 161 attached to the second section 162 by a sliding, extensible connector 163 between the first and second sections 161, 162. The grip 164 may comprise a release button 166. The release button is connected to the frame 112 as in the first embodiment. The frame 112 may comprise a left arm and a right arm. The left arm having a first spacer portion 114 and first spike portion 140. The left arm having a second spacer portion 116 and second spike portion 142. The frame 112 may comprise a first and second spacer portion 114, 116. The first and second spacer portions 114, 116 may be pivotally connected by spring loaded hinge 122 disposed on each spacer portion 114, 116. The spring loaded hinge 122 may comprise spring 118 adapted to bear on first and second spacer portion 114,

116 to urge them to a deployed configuration 138. A first and second spike portions 140, 142 may be attached to a respective spacer portion 114, 116. First spikes 126*a* and second spikes 126*b* are attached to and extend from first and second spike portions 140, 142 respectively. Spikes extend a distance sufficient to pierce the tread of a tire if run over. Second spike chambers 160*b* are formed in second spike portion 142 and disposed to receive first spike 126*a* in the carry configuration 136 (FIG. 14).

Figure 11:
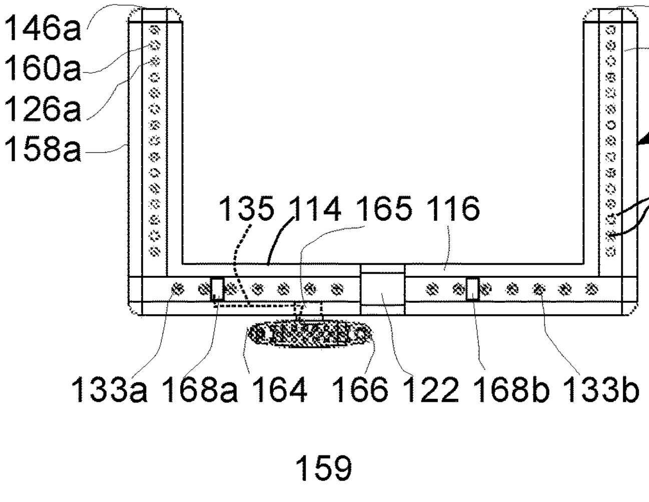
FIG. 11 is a top plan view thereof.
Figure 12:
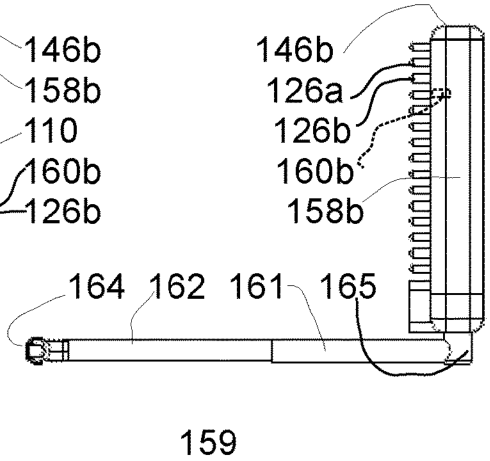
FIG. 12 is a side elevation thereof.

Referring to FIGS. 11 and 12, Tire Spiker with handle 112 may further comprise first spike chambers 160*a* on first spike side 158*a* of first spike portion 140 and corresponding second spike chambers 160*b* and second spikes 126*b* on second spike side 158*b* of second spike portion 142. Distal ends 146*a*, 146*b* of the respective spike portions 140, 142 are spaced from the connected spacer portion 134*a*, 134*b*. LEDs 133*a*, 133*b* may be disposed on first and second spacer portions 114, 116. First latch portion 168*a* maybe attached to second latch portion 168*b* to hold first and second spacer portions 114, 116 in a generally parallel orientation having first spikes 126*a* disposed in second spike chambers 160*b* and second spikes 126*b* in first spike chambers 160*a*. Release button 166 may be attached to latch portions 168*a*, 168*b* by connector 135. Engaging release button 166 may cause first latch portion 168*a* to release second latch portion 168*b* to thereby release first spacer portion 114 from second spacer portion 116 whereby spring loaded hinge 122 may urge first spacer portion 114 toward an end-to-end orientation with second spacer portion 116. The deployed configuration 138 is when the spike portions are spaced from each other and the spacer portions are in an end to end configuration.

Figure 13:
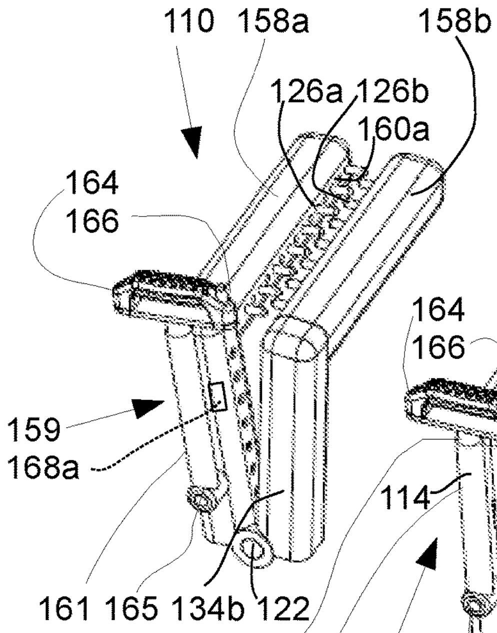
FIG. 13 is a top perspective view thereof in a partially deployed configuration.
Figure 14:
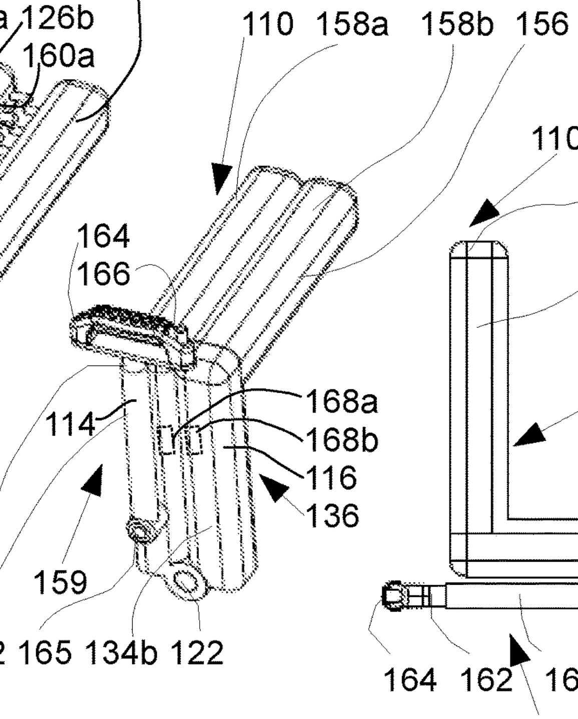
FIG. 14 is a top perspective view thereof in a carry configuration.
Figure 15:
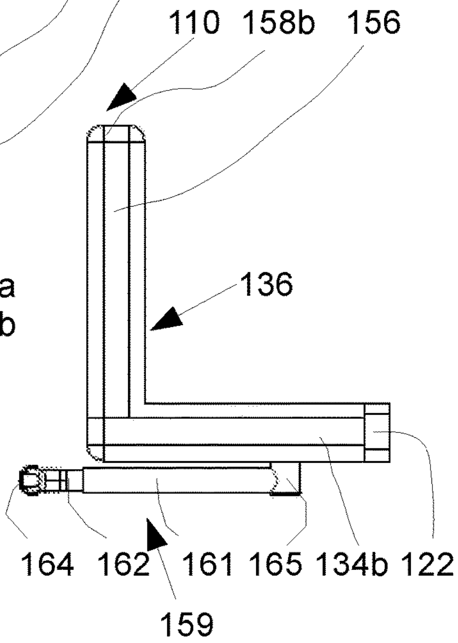
FIG. 15 is a side elevation view thereof in a carry configuration.

Referring to FIGS. 13, 14 and 15, the frame 112 is shown closing to the carry configuration 136 wherein the first spacer portion 114 is parallel and adjacent to the second spacer portion 116. First latch portion 168*a* attaches to second latch portion 168*b* to hold the first and second spacer portions 114, 116 in close proximity and to over come spring loaded hinge 122. Extendable handle 159 may pivot about connector 165 to a parallel orientation with attached first spacer portion 114. Grip 164 may be spaced from frame 112 to provide convenient carrying in the carry configuration 136. The first spike 126*a* attached to and extends from the first spike side and the second spike 126*b* is attached to and extends from the second spike side. First chambers 160*a* are formed in first spike side by removing material to make a hole that is a mirror image of a first spike 126*a*. Latch urges first spike side to bear against second spike side to hold first spike in second spike chamber.

Figure 16:
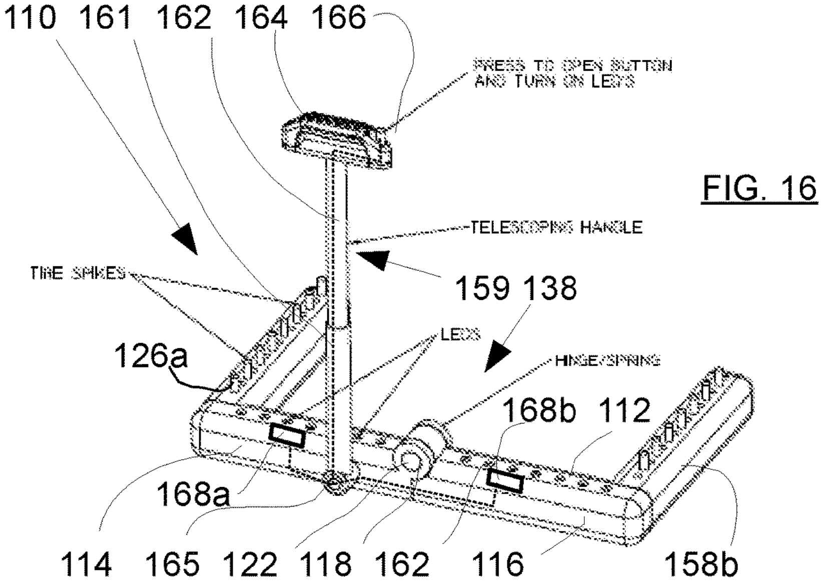
FIG. 16 is a top perspective view thereof in a deployed configuration.
Figure 17:
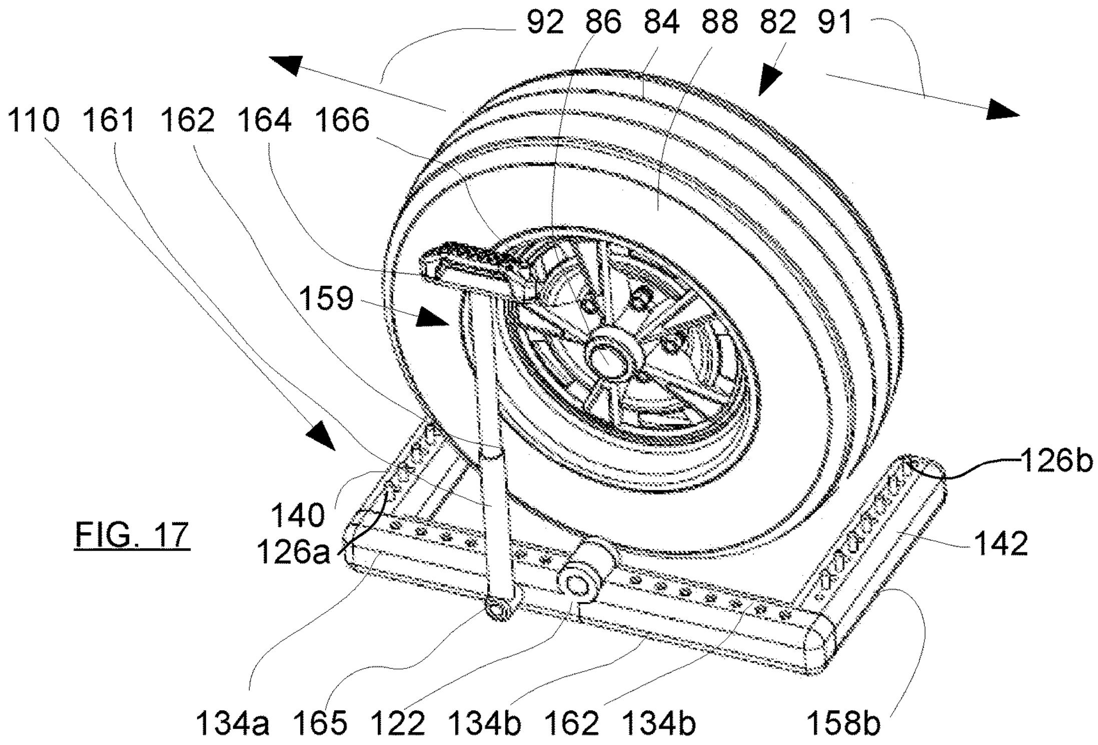
FIG. 17 is a top perspective thereof disposed around a tire.

Referring to FIGS. 16 and 17, the tier spiker with extendable handle 110 in the deployed configuration 138 may comprise a first and second spike portions 140, 142 in spaced relation in front of 92 and behind 91 a tire 82. spikes 126*a* and 126*b* in the respective spike portions 140, 142 are orientated upward to engage the tire tread 84 if the tire rolls forward 92 or backward 91. Spring loaded hinge 122 may be adjacent to tire hub 86 with extendable handle oriented upward from the frame 112 to properly center tire 82 between first and second spike portions 140, 142.

In use referring to FIGS. 10 to 17, tire spiker with extendable handle 110 is carried and stored in the L-Shaped carry configuration 136 wherein lock 168*a*, 168*b* holds the first and second spacer portions 114, 116 in a generally parallel orientation adjacent to or bearing against each other. The first spike portion 140 is adjacent to or on the second spike portion 142 in a generally parallel orientation adjacent to or bearing against each other. Each spike 126*a*, 126*b* is nested in a respective spike chamber 160*a*, 160*b*. When needed, the extendable handle 159 may be pivoted about connector 165 to a generally perpendicular orientation to first spacer portion 114. Release button 166 may be depressed to release portion latch 168*a* from second latch portion 168*b* thereby allowing spring loaded hinge 122 to urge first and second spacer portions 114, 116 to the deployed configuration 138. In the deployed configuration 138, first spike portion 114 may be spaced from second spike portion 116 in a generally parallel orientation thereby exposing spikes 126*a*, 126*b*. While maintaining eye contact with the driver, the officer may move the tire spiker with extendable handle 110 to a position having the first spike portion 140 and second spike portion 142 in front of and behind tire 82. After use, the first spacer portion and second spacer portions are folded about spring loaded hinge to the carry configuration engaging first and second latch portions 168*a*, 168*b* to hold spike portions in close relation whereby spikes 126*a* in the first spike portion 140 are disposed in spike chambers 160*b* in second spike portion 142

While specific embodiments have been shown and described to point out fundamental and novel features of the invention as applied to the preferred embodiments, it will be understood that various omissions and substitutions and changes of the form and details of the invention illustrated and in the operation may be done by those skilled in the art, without departing from the spirit of the invention.

The invention claimed is:

1. A tire spiker comprising:

a frame comprising a first and second spacer portion and a latch, the first spacer portion comprising a first top side, a first hinge end and a first spike end, the second spacer portion comprising a second top side, a second hinge end and a second spike end, the first hinge end pivotally attached to the second hinge end;

a first and second spike portion, the first spike portion comprising a first spike side, a first spacer end and a first distal end, the second spike portion comprising a second spike side, a second spacer end and a second distal end, the first spacer end attached to the first spike end, the second spike end attached to the second spacer end, a first spike chamber in the first spike portion, the first spike chamber opening on the first spike side, a second spike chamber in the second spike portion, the second spike chamber opening in the second spike side;

a hinge comprising a first end and a second end, the first end on the first hinge end, the second end on the second hinge end whereby the first and second spacer portions are movable from an L-shaped carry configuration to a U-shaped deployed configuration;

a latch on the frame, the latch comprising a first latch portion on the first spacer portion and a second latch portion on the second spacer portion, the first latch portion releasably attached to the second latch portion to hold the frame in the carry configuration;

a first spike and a second spike, the first spike in the first spike portion and the second spike in the second spike portion, the first and second spikes each comprising a tip, the first spike disposed in a generally perpendicular orientation to and extending from the first spike side, the first spike tip spaced from the first spike side, the second spike disposed in a generally perpendicular orientation to and extending from the second spike side, the second spike tip spaced from the second spike side, the first spike disposed in the second spike chamber in the carry configuration, the second spike chamber adapted to receive the first spike, the second spike disposed in the first spike chamber, the second spike chamber adapted to receive the first spike; and a handle, the handle comprising a first section, a grip and a release button, the first section on the frame, the grip on the first section in spaced relation to the frame, the release button on the handle, the release button connected to the latch, the release button adapted to disengage the latch thereby disconnecting the first spacer portion from the second spacer portion.

2. The tire spiker of claim 1, further comprising an indicator on the frame, the indicator adapted to indicate when the frame is in the deployed configuration.

3. The tire spiker of claim 1, further comprising a spring in the frame, the spring adapted to urge the first and second spacer portions to the deployed configuration.

4. The tire spiker of claim 1, further comprising a switch on the frame, the switch adapted to energize the indicator in the deployed configuration.

5. The tire spiker of claim 4, wherein the switch is disposed in one of the second spike chambers, the switch adapted to bear against a respective one of the plurality of first spikes in the carry configuration.

6. A tire spiker comprising:

a frame comprising a first and second spacer portion, the first spacer portion comprising a first top side, a first hinge end and a first spike end, the second spacer portion comprising a second top side, a second hinge end and a second spike end, the first hinge end pivotally attached to the second hinge end whereby the first and second spacer portions are movable from a carry configuration to a deployed configuration;

a first and second spike portion, the first spike portion comprising a first spike side, a first spacer end and a first distal end, the second spike portion comprising a second spike side, a second spacer end and a second distal end, the first spacer end on the first spike end, the second spike end on the second spacer end, a plurality of first spike chambers in the first spike portion, each of the plurality of first spike chambers opening on the first spike side, a plurality of second spike chambers in the second spike portion, each of the of the plurality of second spike chambers opening in the second spike side;

a plurality of first spikes and a plurality of second spikes, each one of the plurality of first and second spikes comprising a tip, each one of the plurality of first spikes attached to and extending from the first spike side, each one of the plurality of first spikes generally perpendicular to the first spike side, the tip of each one of the plurality of first spikes spaced from the first spike side, each one of the plurality of second spikes attached to and extending from the second spike side, each one of the plurality of second spikes generally perpendicular to the second spike side, the tip of each of the plurality of second spikes spaced from the second spike side whereby each one of the plurality of first and second spike tips are exposed in the U-shaped deployed configuration, each one of the plurality of first spike chambers adapted to removably receive one of the plurality of second spikes, each one of the plurality of second spike chambers adapted to removably receive one of the plurality of first spikes whereby each one of the plurality of first and second spike tips are in a respective spike chamber in the carry configuration;

a latch, the latch adapted to hold the tire spiker in the L-shaped carry configuration; and a handle on the frame, the handle comprising an extendable shaft, a grip and a release button, the extendable shaft comprising a first section attached to the frame, the second section attached to the grip, the grip disposed in spaced relation to the frame, the release button on the handle, the release button attached to the latch.

7. The tire spiker of claim 5, further comprising a hinge, the hinge on the first hinge end, the hinge on the second hinge end, the hinge adapted to pivotally attached to the first spacer portion to the second spacer portion.

8. The tire spiker of claim 5, further comprising a kick plate on the second spacer portion.

9. The tire spiker of claim 5, further comprising an indicator, the indicator comprising a battery, a switch and a light, the battery connected to the switch, the switch connected to the light, the switch adapted to to connect the battery to the light when the tire spiker is in the deployed configuration.

10. The tire spiker of claim 8, wherein the switch is disposed in one of the plurality of second spike chambers, the switch adapted to bear against one of the plurality of first spikes in the carry configuration, the switch adapted to connect the light to the battery in the deployed configuration.

11. The tire spiker of claim 5, wherein one of the plurality of first spike chambers is disposed between each adjacent pair of the plurality of first spikes, one of the plurality of second spike chambers is disposed between each adjacent pair of the plurality of second spikes whereby each one of the plurality of first spikes has a corresponding second spike chamber adapted to receive the respective one of the plurality of first spikes and each one of the plurality of second spikes has a corresponding first spike chamber adapted to receive the respective one of the plurality of second spikes.

12. The tire spiker of claim 6, wherein each one of the plurality of first and second spikes are disposed in a respective one of the first and second spike chambers in the opposing spike portion in the carry configuration.

13. A tire spiker comprising a frame and a handle, the frame comprising a first spike portion, a second spike portion and a hinge, the first spike portion comprising a first spike side, the first spike side comprising a plurality of first spikes extending from the first spike side and a plurality of first spike chambers, each of the first spike chambers having an opening on the first spike side, the second spike portion comprising a second spike side, the second spike side comprising a plurality of second spikes extending from the second spike side and a plurality of second spike chambers, each of the second spike chambers having an opening on the second spike side, the hinge connected to the first spike portion and the second spike portion whereby the frame is movable from a deployed configuration having the first spike portion in spaced relation to the second spike portion, to a carry configuration having the first spike portion on the second spike portion and each one of the plurality of first spikes disposed in one of the plurality of second spike chambers and each one of the plurality of second spikes disposed in one of the plurality of first spike chambers;

a latch on the frame, the latch adapted to removably attach the first spike portion to the second spike portion having each spike in a respective chamber; and a handle, the handle comprising a first section, a second section, a release button, the first section on the frame the second section on the first section, the grip on the second section spaced from the frame, the release button on the handle, the release button attached to the latch, the release button adapted to engage the latch to disconnect the first spike portion from the second spike portion.

14. The tire spiker of claim 13, further comprising a plurality of LEDs in the first spiker portion, the LEDs adapted to illuminate when the tire spiker is in the deployed configuration.

* * * * *